United States Patent

[11] 3,596,525

[72] Inventor George M. Niesz
 Cincinnati, Ohio
[21] Appl. No. 849,479
[22] Filed Aug. 12, 1969
[45] Patented Aug. 3, 1971
[73] Assignee F. L. Cappaert d/b/a Cappaert Enterprises
 Vicksburg, Miss.

[54] PORTABLE TOOL ATTACHMENT
 6 Claims, 3 Drawing Figs.
[52] U.S. Cl. .................................................. 74/57,
 143/34
[51] Int. Cl. ........................................ F16h 25/16
[50] Field of Search ........................................ 184/6 K;
 92/31, 33; 143/34; 74/57; 308/77

[56] References Cited
 UNITED STATES PATENTS
 2,548,411 4/1951 Vache .......................... 74/57
 2,941,555 6/1960 Hornbostel .................. 143/34
 3,217,656 11/1965 Oakes ........................... 308/77

Primary Examiner—William F. O'Dea
Assistant Examiner—Wesley S. Ratliff, Jr.
Attorney—Wood, Herron & Evans ABSTRACT: A rotary to linear tool attachment adapted to be secured to an underwater power tool so as to enable a rotary output shaft of the tool to drive a reciprocating output shaft of the adapter. Specifically, the adapter enables the rotary output shaft of a power tool to drive rotary saws, chippers, descalers or hammers for underwater applications.

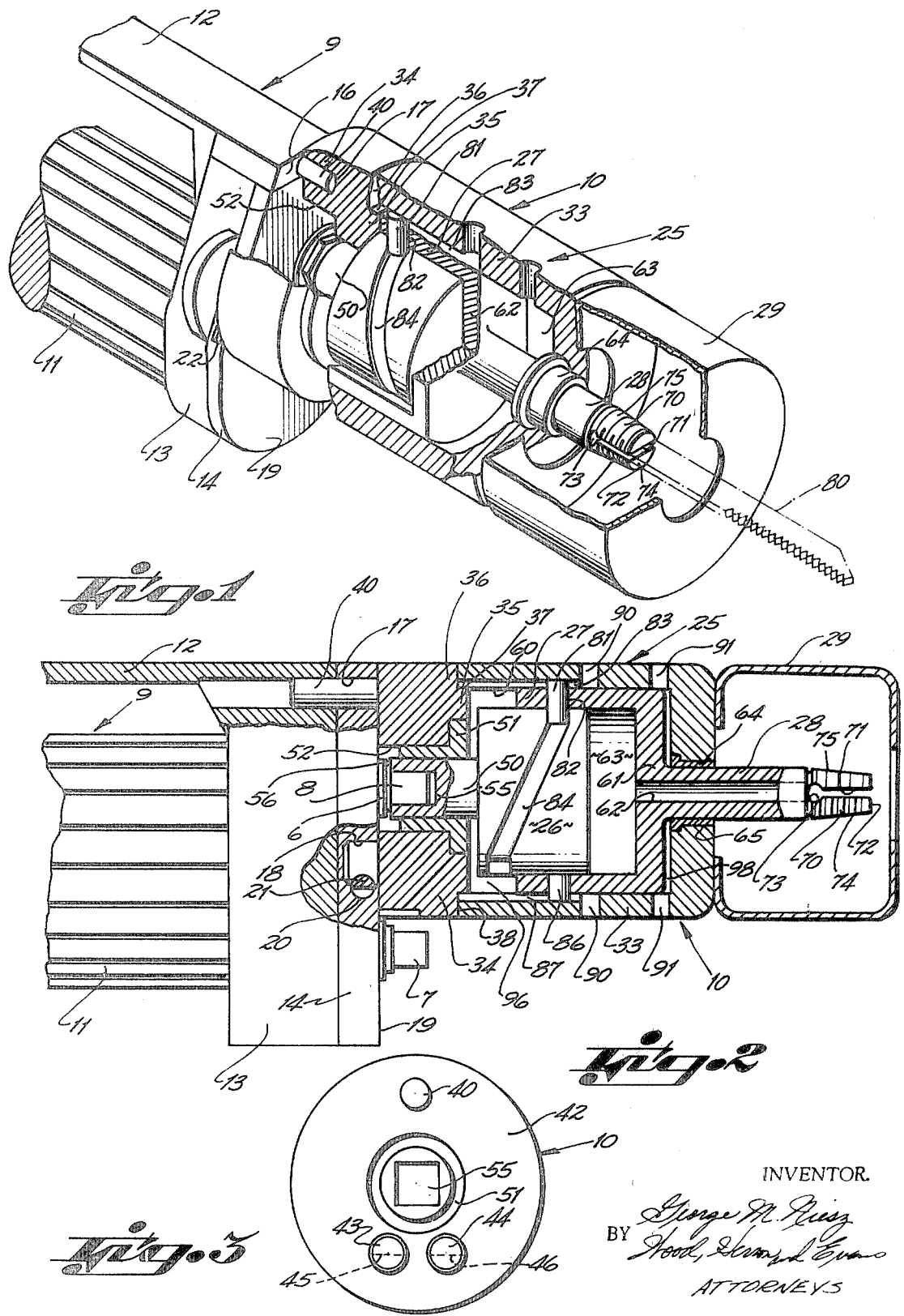

PORTABLE TOOL ATTACHMENT

This invention relates to motor driven power tools and more particularly to an attachment for an underwater power tool.

In application Ser. No. 774,622 of D.J. Hackman et al. and assigned to the assignee of this application, there is disclosed an electric motor driven portable power tool adapted to be utilized underwater for the accomplishment of work which had heretofore always been done manually with handtools or possibly at shallow depths with pneumatic tools. The power tool disclosed in that application is depth insensitive in that water circulates through the tool so that it may be used at any water depth. The tool has a pair of rotatable output shafts which enable the tool to be utilized to drive or rotate drills, rotary saws, wrenches, screwdrivers, nut and bolt tighteners, or any other type of rotatable tool.

There are however numerous jobs or operations done underwater which require a power driven reciprocating tool rather than a rotating one. Examples of such work are sawing, chipping, descaling, hammering. There is therefore a need for an attachment or accessory to enable the power driven tool disclosed in the above-identified application to be used to accomplish these work assignments.

It has therefore been an objective of this invention to provide an attachment for an underwater power tool to enable a rotary output shaft of the tool to be utilized to power or drive a reciprocating tool.

Another objective of this invention has been to provide an easily attachable and removable accessory for a rotary driven power tool to enable the tool to be utilized underwater for driving reciprocating tools. In underwater applications it is imperative that accessories be easily attachable and removable from the power mechanism because of environmental limitations imposed upon a man at a depth of several hundred feet in the water. Additionally, there must be a minimum of parts involved in making the attachment or removal because of the likelihood or probability of one being dropped, possibly to an irretrievable depth below the work level at which the tool is being used.

These objectives are accomplished and this invention is partially predicated upon the concept of utilizing a single piece of rotary to linear converter adapted to be easily secured to the front face of a motor driven tool to the converter. When coupled, rotation of the shaft effects reciprocation of the converter's output shaft. The coupling of the attachment is accomplished by a pair of notched prongs on the rear face of the adapter which are receivable in apertures in the front face of the tool. A rotatable lock built into the tool accomplishes locking of the attachment onto the tool by simply rotating a handled locking cam. When thus coupled, the rotary output shaft is operable to drive a barrel cam interiorly of the attachment. This barrel cam has an endless helical groove therein which effects reciprocation of a nonrotatable sleeve through a cam follower attached to the sleeve. The sleeve in turn is connected at its forward end to a reciprocal output shaft so that rotation of the barrel cam effects reciprocation of the output shaft. The complete attachment is made from noncorrosive stainless steel and anodized aluminum and the bearings are made of graphite. Water is circulated throughout the complete attachment and serves to lubricate and cool it. Therefore, the complete attachment is depth insensitive and may be taken to any water depth without fear of its collapse or seizure of the moving parts.

These and other objects and advantages of this invention will be more readily apparent from the following description of the drawings in which:

FIG. 1 is a perspective view, partially broken away, of the adapter of this invention secured to the end of a portable power tool, FIG. 2 is a cross-sectional view through the adapter of FIG. 1, and FIG. 3 is a rear end elevational view of the adapter.

Referring first to FIG. 1, there is illustrated a portable electric motor driven power tool 9 of the type with which the adapter 10 of this invention is intended to be used. A complete disclosure of this power tool 9 is contained in application Ser. No. 774,622, assigned to the assignee of this application. Generally, this tool 9 comprises a motor housing 11, a handle 12, an end plate 13, and an end cap 14 from which two rotatable output shafts 6 and 7 protrude.

The end cap 14 and the end face 16 of the handle 12 together define a flat end surface 19 against which the adapter 10 of this invention is intended to be secured. There is a guide pin receiving aperture 17 extending inwardly from the front face 16 of the handle 12 and a pair of lockpin receiving apertures 18 (only one of which is illustrated) in the end face 19 of the end cap 14. A lock shaft for securing the adapter onto the end face 19 of the tool 9 extends laterally through and is rotatably mounted within an aperture 20 of the end cap 14. This lock shaft 21 has a handle 22 secured to its outer end through which it may be rotated so as to effect locking of the adapter 10 onto the tool 9 as is explained more fully hereinafter.

The adapter 10 comprises a housing 25, a rotatable barrel cam 26, a reciprocatable sleeve 27, and a reciprocatable output shaft 28. A cylindrical shield or tool guard 29 preferably surrounds the output shaft 28 and is secured to the end face of the housing 25.

Housing 25 comprises a generally cup-shaped body 33 closed at the rear by an end cap 34. Both the body 33 and the end cap 34 are made from aluminum and are anodized so as to resist the corrosive effects of salt water.

The end cap 34 has a small diameter end section 35 on its front wall which extends into the open rear end of the body 33. A shoulder 37 between the two different diameter sections 35, 36 seats against the end face 38 of the body 33.

A locating pin 40 extends rearwardly from the rear face 42 of the end cap 34. Additionally, a pair of locking lugs 43, 44 extend rearwardly from this face 42. When mounted upon the tool 9, the locating pin 40 extends into the bore 17 in the handle 12 of the tool 9 and the locking lugs 43 and 44 seat within the apertures 18 in the end face 19 of the cap 14. Semicylindrical notches 45, 46 are machined from the bottom of the lugs 44 and 43 and are adapted to receive semicylindrical sections of the locking shaft 21. When the adapter is initially placed on the tool, the semicylindrical sections of the shaft 21 are out of alignment with the lugs 43, 44. To lock the lugs and thus the adapter 10 on the end face 19 of the tool, the shaft 21 is rotated through 180° to the position shown in FIG. 2 in which the semicylindrical sections of the shaft engage the notches 45 and 46 and lock the adapter 10 to the tool 9.

The barrel cam 26 is journaled for rotation interiorly of the body 25. This cam 26 has a small diameter end section 50 extending rearwardly from it into a graphite bearing 51 press fit into an aperture 52 which extends through the end cap 34. A suitable graphite bearing is marketed under the trademark "Graphitar." A square recess 55 is machined in the end face 56 of the shaft section 50 and is adapted to receive the square end 8 of the output shaft 6 of tool 9. Rotation of the shaft 6 thereby effects rotation of the shaft 50 through the key and slot type drive of the end section 8 of the shaft 6 and the correspondingly shaped receptacle 55 in the end of the shaft 50. Rotation of the shaft 50 also effects rotation of the integral barrel cam 26.

The sleeve 27 is mounted for sliding movement between the external surface of the cam 26 and the interior surface 60 of the body 33. It has a radially inwardly extending flange 61 in its front end connected to the output shaft 28. A central bore 62 extends axially through the shaft 28 so as to connect the open front end of the shaft 28 to the interior chamber 63 of the body 33. A graphite bearing 64 press fit into a bore 65 in the front of the body 33 supports the shaft 28 for rotation in the housing. The front end of the shaft 28 is tapered and threaded as indicated at 70 and has an axial slot 71 extending inwardly from the front end 72. This slot intersects a transverse bore 73 at its inner end. When an untapered threaded sleeve is threaded onto the tapered threaded end 70 of the shaft 28 it effects a clamping of the opposite halves or jaws 74, 75 in the end of the shaft. These jaws thereby are caused to act as an arbor to clamp a tool 80 therebetween.

To effect reciprocation of the sleeve 27 and attached output shaft 28 upon rotation of the barrel cam 26, a cam follower pin 81 is press fit through an aperture 82 in the sleeve 27. At its outer end, this pin is slidable in a keyway slot 83 in the body 33 and at its outer end it is receivable in a groove 84 in the periphery of the barrel cam. This groove 84 defines a generally helical endless cam surface which is operative upon rotation of the barrel cam 26 to effect reciprocation of the pin 81 and the attached sleeve 27. Preferably, a second pin 86 extends outwardly from the sleeve 27 on the side of the sleeve opposite from the pin 81 and is slidable within a keyway slot 87 in the body.

To facilitate water cooling and lubrication of the tool, a pair of water flow ports 90, 91 extend through the body 33 of the housing. The two rearwardmost ports 90 open into the keyway slots 83, 87 so as to lubricate the slidable key and keyway as well as to permit the flow of water into the chamber 96 surrounding the barrel cam 26. Water therefore flows freely around the graphite bearings 51 and 64. The ports 91 at the front of the body 33 permit water to be expelled from the chamber 98 in front of the flange 61 of the sleeve 27. Therefore, water contained in this chamber cannot cushion or act as a dampener to retard reciprocation of the sleeve and output shaft.

In operation, rotation of the output shaft 6 of the tool 9 effects rotation of the barrel cam 26. Rotation of the cam 26 in turn causes the pin 81 and attached sleeve 27 to reciprocate as a result of its being forced to follow the contour of the cam groove 84 in the periphery of the cam 26. Since the sleeve 27 and pin 81 are restrained against rotation by the key 81, 86 and keyway 83, 87 connections between the sleeve and the body, the sleeve 27 cannot rotate but reciprocates only, thereby effecting reciprocation of the output shaft 28 and of a tool 80 mounted therein.

The tool heretofore described is intended to be used underwater, and particularly in a salt water environment. It must therefore be completely resistant to corrosion. Accordingly, the barrel cam 26 as well as the sleeve 27 and output shaft 28 are preferably made from stainless steel while the housing is made from anodized aluminum. Graphite bearings are suitable for use in this underwater corrosive environment.

The tool 80 illustrated in the drawings as being mounted in the adapter 10 is a metal hacksaw but it could as well be any one of numerous reciprocating tools as for example a hammer, a chipper, or a descaler, all of which are commonly used underwater and are exceedingly difficult to use at great depths without a power tool to effect reciprocation.

While only a single preferred embodiment has been illustrated and described herein, those persons skilled in the art to which this invention pertains will readily appreciate numerous changes and modifications which may be made without departing from the spirit of my invention. Therefore I do not intend to be limited except by the scope of the appended claims.

Having described my invention I claim:

1. A rotary to linear converter for use in combination with an underwater portable power tool having a driven rotary output shaft and a flat mounting face normal to the axis of said shaft, said tool having a spaced pair of prong receiving apertures extending into said front face and a movable locking element having an axis parallel to said front face located in a plane to intersect at least one of said apertures, said converter comprising a housing having a flat rear wall adapted to be secured in juxtaposition to said mounting face of said tool, said housing having a pair of spaced prongs extending rearwardly from said rear wall and adapted to be received in said apertures of said mounting face and to be locked thereon by movement of said locking element into engagement with a notch of at least one of said prongs, at least one water flow port in said housing to permit the ingress and egress of lubricating and cooling water flow through said housing, a barrel element rotatably mounted within said housing, a sleeve element surrounding said barrel, one of said barrel and sleeve elements having a continuous spiral cam groove in the periphery thereof, connector means for drivingly connecting one of said elements to said output shaft of said tool, cam follower means secured to one of said elements and extending into said cam groove of the other element, a key and keyway operable between one of said elements and said housing to prevent rotation of said element relative to said housing, reciprocable output shaft means extending forwardly from the front of said sleeve, and means on the forward end of said reciprocatable output shaft for interchangeably connecting reciprocatable tools to said reciprocatable output shaft.

2. A rotary to linear converter for use on an underwater portable power tool having a driven rotary output shaft and a flat mounting face normal to the axis of said shaft, said tool having a spaced pair of prong receiving apertures extending into said front face and a movable locking element having an axis parallel to said front face located in a plane to intersect at least one of said apertures, said converter comprising a housing having a flat rear wall adapted to be secured in juxtaposition to said mounting face of said tool, said housing having a pair of spaced prongs extending rearwardly from said mounting face and to be locked thereon by movement of said locking element into engagement with a notch of at least one of said prongs, at least one water flow port in said housing to permit the flow of water throughout the interior of said housing to cool and lubricate said converter, a barrel cam having a continuous spiral cam groove in the periphery thereof, connector means for drivingly connecting said barrel cam to said output shaft of said tool, a sleeve surrounding said barrel cam, cam follower means secured to said sleeve and extending into said cam groove of said barrel cam, a key and keyway operable between said sleeve and said housing to prevent rotation of said sleeve relative to said housing, reciprocatable output shaft means extending forwardly from the front of said sleeve, and means on the forward end of said reciprocatable output shaft for interchangeably connecting reciprocatable tools to said reciprocatable output shaft.

3. The rotary to linear converter of claim 2 wherein said housing is made from aluminum and is exteriorly anodized to resist salt water attack.

4. The rotary to linear converter of claim 3 wherein said sleeve and reciprocatable output shaft are made from stainless steel to resist salt water attack.

5. The rotary to linear converter of claim 4 which further includes at least one bearing located interiorly of said housing, said bearing being water cooled and lubricated.

6. The rotary to linear converter of claim 5 wherein said bearing is made from graphite.

UNITED STATES PATENT OFFICE
CERTIFICATE OF CORRECTION

Patent No. 3,596,525     Dated August 3, 1971

Inventor(s) George M. Niesz

It is certified that error appears in the above-identified patent and that said Letters Patent are hereby corrected as shown below:

Col. 1, line 36, after "hundred", change "feel" to -- feet --.

Col. 1, line 43, after "single piece", delete -- of --.

Col. 4, line 36, after "from said", add -- rear wall and adapted to be received in said apertures of --.

Col. 4, line 42, after "a barrel cam" and before "having a continuous spiral cam", add -- rotatably mounted within said housing, said cam --.

Signed and sealed this 28th day of March 1972.

(SEAL)
Attest:

EDWARD M. FLETCHER, JR.
Attesting Officer

ROBERT GOTTSCHALK
Commissioner of Patents